United States Patent
Kim

(10) Patent No.: US 9,023,504 B2
(45) Date of Patent: May 5, 2015

(54) SECONDARY BATTERY MODULE AND BATTERY SPACER OF SECONDARY BATTERY MODULE

(75) Inventor: Miso Kim, Suwon-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 524 days.

(21) Appl. No.: 12/926,666

(22) Filed: Dec. 2, 2010

(65) Prior Publication Data
US 2011/0135985 A1    Jun. 9, 2011

(30) Foreign Application Priority Data
Dec. 4, 2009  (KR) .................. 10-2009-0119700

(51) Int. Cl.
| | | |
|---|---|---|
| H01M 2/14 | (2006.01) | |
| H01M 2/18 | (2006.01) | |
| H01M 10/613 | (2014.01) | |
| H01M 10/02 | (2006.01) | |
| H01M 10/647 | (2014.01) | |
| H01M 10/6555 | (2014.01) | |

(52) U.S. Cl.
CPC .......... H01M 10/5004 (2013.01); H01M 10/02 (2013.01); H01M 10/5032 (2013.01); H01M 10/5055 (2013.01)

(58) Field of Classification Search
CPC ....................................................... H01M 2/14
USPC .................. 429/129, 130, 147, 148, 143, 135
See application file for complete search history.

(56) References Cited

U.S. PATENT DOCUMENTS

2009/0061299 A1    3/2009  Uchida et al.

FOREIGN PATENT DOCUMENTS

| JP | 2006-048996 A | | 2/2006 | |
| JP | 2009-054403 | * | 3/2009 | ............ H01M 10/50 |
| JP | 2009-054403 A | | 3/2009 | |
| KR | 10 2006-00631 A | | 6/2006 | |
| KR | 10-0717751 | * | 5/2007 | .............. H01M 2/10 |
| KR | 10-0717751 B1 | | 5/2007 | |
| KR | 10 2008-00327 A | | 4/2008 | |
| KR | 10-20080032748 | * | 4/2008 | .............. H01M 2/02 |

OTHER PUBLICATIONS

Office Action issued in corresponding Korean application, 10-2009-0119700, dated Mar. 30, 2011.

* cited by examiner

*Primary Examiner* — Patrick Ryan
*Assistant Examiner* — Angela Martin
(74) *Attorney, Agent, or Firm* — Lee & Morse, P.C.

(57) ABSTRACT

A secondary battery module and a battery spacer, the secondary battery module including a plurality of unit cells; and a battery spacer between the unit cells, the battery spacer including a base portion, the base portion including a portion contacting a large side surface of a unit cell, a wing portion projecting from the base portion toward an adjacent battery spacer and enclosing at least a portion of a small side surface of the unit cell, and a fastening portion on the wing portion, the fastening portion being for coupling the battery spacer to an adjacent battery spacer.

22 Claims, 20 Drawing Sheets

SECONDARY BATTERY MODULE AND BATTERY SPACER OF SECONDARY BATTERY MODULE

BACKGROUND

1. Field

Embodiments relate to a secondary battery module and a battery spacer of the secondary battery module.

2. Description of the Related Art

In general, a secondary battery that is capable of being charged and discharged may use a plurality of unit battery cells connected in series or in parallel in order to ensure sufficient power capacity. Such a plurality of unit cells that are connected in series or in parallel to form one battery is called a secondary battery module.

SUMMARY

Embodiments are directed to a secondary battery module and a battery spacer of the secondary battery module, which represent advances over the related art.

It is a feature of an embodiment to provide a secondary battery module and a battery spacer of the secondary battery module having good alignment and cooling efficiency and that are capable of preventing damage due to expansion of unit battery cells.

At least one of the above and other features and advantages may be realized by providing a secondary battery module including a plurality of unit cells; and a battery spacer between the unit cells, the battery spacer including a base portion, the base portion including a portion contacting a large side surface of a unit cell, a wing portion projecting from the base portion toward an adjacent battery spacer and enclosing at least a portion of a small side surface of the unit cell, and a fastening portion on the wing portion, the fastening portion being for coupling the battery spacer to an adjacent battery spacer.

The fastening portion may include a fastening projection extending from an end of the wing portion toward an adjacent battery spacer; and a fastening recess corresponding to the fastening projection, the fastening recess being disposed on an opposite end of the wing portion.

The fastening projection may have a rectangular bar-shape, a vertical length less than a vertical length of the wing portion, and a horizontal width narrower than a horizontal width of the wing portion.

The fastening portion may include a first fastening portion extending from an end of the wing portion toward an adjacent battery spacer, the first fastening portion having a horizontal width narrower than a horizontal width of the wing portion; and a second fastening portion on an opposite end of the wing portion and projecting toward another adjacent battery spacer, the second fastening portion having a horizontal width narrower than a horizontal width of the wing portion, wherein a side surface of the first fastening portion extending toward the adjacent battery spacer is coplanar to a side surface of the wing portion, and a side surface of the second fastening portion extending toward the other adjacent battery spacer is coplanar to an opposite side surface of the wing portion.

The fastening portion may further include a fastening ridge on a surface of the first fastening portion facing a unit cell; and a fastening valley on the second fastening portion and corresponding to the fastening ridge.

The fastening ridge may have a triangular horizontal section.

The fastening portion may include a sliding fastening projection extending from an end of the wing portion toward an adjacent battery spacer, the sliding fastening projection having a round horizontal end cross section; and a sliding fastening receptacle on an opposite end of the wing portion and corresponding to the sliding fastening projection.

The sliding fastening projection may have a horizontal width narrower than a horizontal width of the wing portion, and a length from a bottom to a top of the sliding fastening projection may be equal to a length from a bottom to a top of the wing portion.

The base portion may be configured to be capable of accommodating swelling of the unit cell.

A surface of the base portion that faces a large side surface of the unit cell may be concave in a direction opposite to the unit cell.

A surface of the base portion facing a large side surface of the unit cell may include a receiving hole through a center thereof.

The base portion may include at least one corrugated recess extending from a bottom to a top of the base portion.

The wing portion may include at least one heat sink hole.

The battery spacer may be formed from at least one of a rubber material, a silicon material, a heat resistant plastic, and a heat resistant metal.

The unit cell may be a pouch-type unit cell.

At least one of the above and other features and advantages may also be realized by providing a battery spacer including a base portion, the base portion including a portion for contacting a large side surface of a unit cell; a wing portion projecting from the base portion and configured to project toward an adjacent battery spacer, the wing portion being for enclosing at least a portion of a small side surface of the unit cell; and a fastening portion on the wing portion, the fastening portion being for coupling the battery spacer to an adjacent battery spacer.

The fastening portion may include a fastening projection extending from an end of the wing portion and being configured to project toward an adjacent battery spacer; and a fastening recess corresponding to the fastening projection, the fastening recess being disposed on an opposite end of the wing portion.

The fastening portion may include a first fastening portion extending from an end of the wing portion and being configured to extend toward an adjacent battery spacer, the first fastening portion having a horizontal width narrower than a horizontal width of the wing portion; a second fastening portion on an opposite end of the wing portion and being configured to project toward another adjacent battery spacer, the second fastening portion having a horizontal width narrower than a horizontal width of the wing portion; a fastening ridge on a surface of the first fastening portion and being configured to face the unit cell; and a fastening valley on the second fastening portion and corresponding to the fastening ridge, wherein a side surface of the first fastening portion for extending toward the adjacent battery spacer is coplanar to a side surface of the wing portion, and a side surface of the second fastening portion for extending toward the other adjacent battery spacer is coplanar to an opposite side surface of the wing portion.

The fastening portion may include a sliding fastening projection extending from an end of the wing portion and being configured to extend toward an adjacent battery spacer, the sliding fastening projection having a round horizontal end cross section; and a sliding fastening receptacle on an opposite end of the wing portion and corresponding to the sliding fastening projection.

A surface of the base portion for facing a large side surface of the unit cell may be configured to be concave in a direction opposite to the unit cell.

A surface of the base portion facing a large side surface of the unit cell may include a receiving hole through a center thereof.

The base portion may include at least one corrugated recess extending from a bottom to a top of the base portion.

The wing portion may include at least one heat sink hole.

The battery spacer may be formed from at least one of a rubber material, a silicon material, a heat resistant plastic, and a heat resistant metal.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1A:
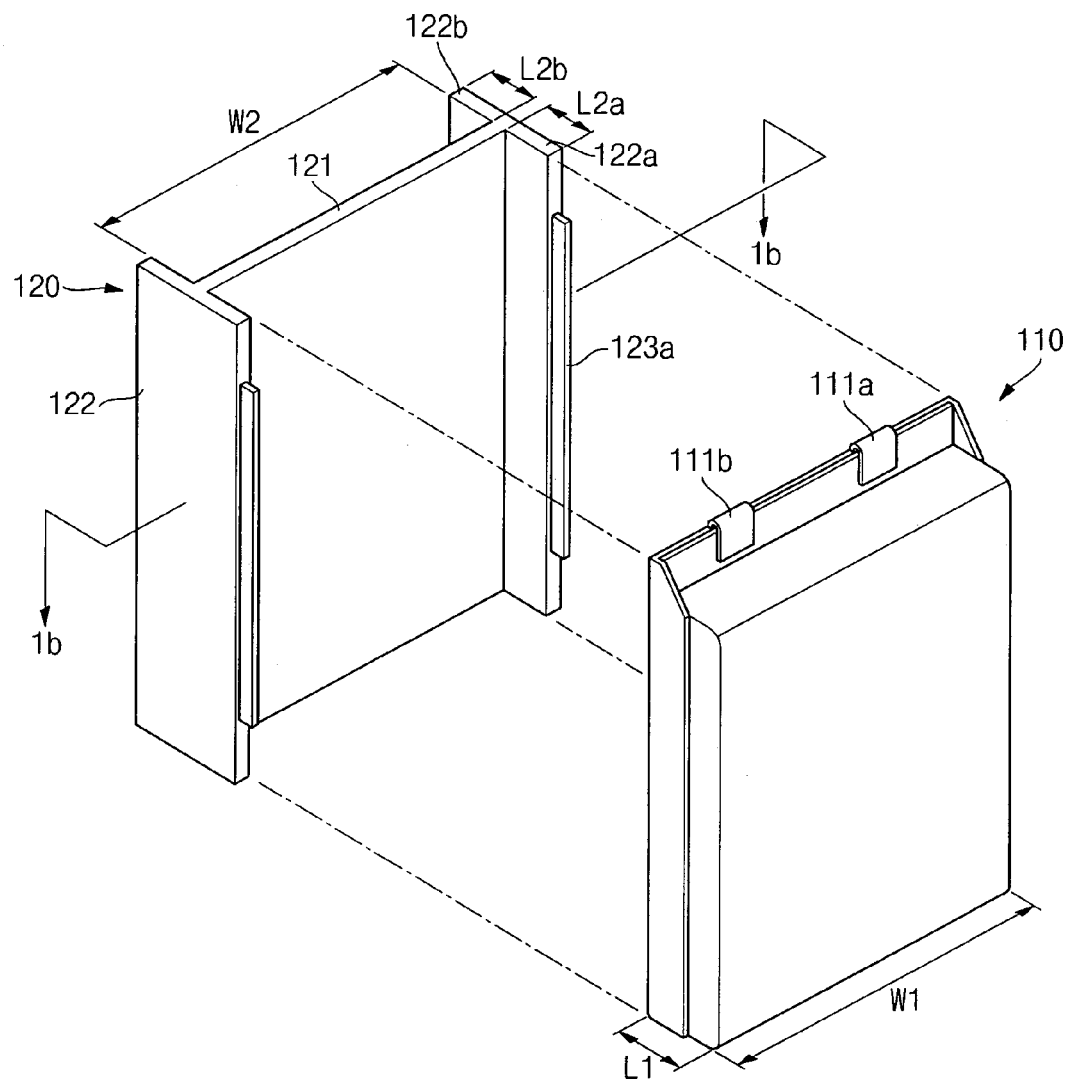
FIG. 1A illustrates a perspective view of coupling of a battery spacer and a unit battery cell according to an embodiment.

Korean Patent Application No. 10-2009-0119700, filed on Dec. 4, 2009, in the Korean Intellectual Property Office, and entitled: "Secondary Battery Module and Battery Spacer of Secondary Battery Module," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Example embodiments of a secondary battery module and a battery spacer of the secondary battery module will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope to those skilled in the art.

Figure 1B:
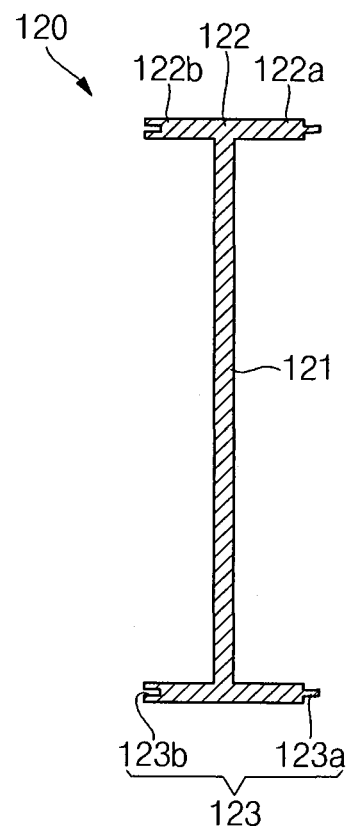
FIG. 1B illustrates a sectional view taken along line 1b-1b of FIG. 1A.
Figure 1C:
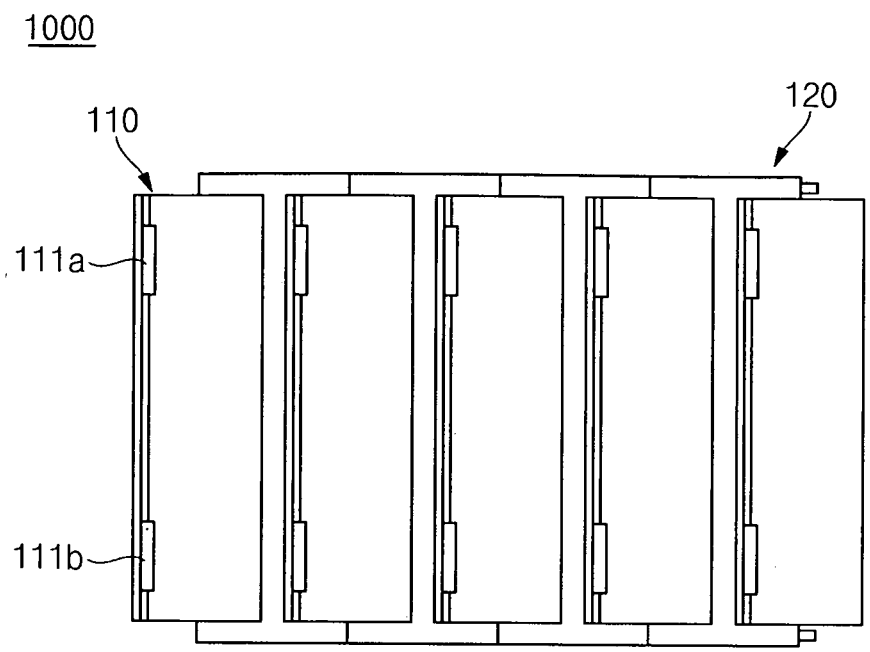
FIG. 1C illustrates a schematic plan view of a secondary battery module according to an embodiment.

FIG. 1A illustrates a perspective view of coupling of a battery spacer and unit battery cell according to an embodiment. FIG. 1B illustrates a sectional view taken along line 1b-1b of FIG. 1A. FIG. 1C illustrates a schematic plan diagram of a secondary battery module according to an embodiment.

Referring to FIGS. 1A, 1B, and 1C, a secondary battery module 1000 according to the present embodiment may include a unit cell 110 and a battery spacer 120.

The unit cell 110 may be a secondary battery that can be charged and discharged. In an implementation, the unit cell 110 may be a pouch-type secondary battery. The unit cell 110 may include electrode tabs 111a and 111b with respectively different polarities. One electrode tab 111a may be electrically connected to a negative electrode of an electrode assembly (not illustrated) within the unit cell 110 and the other electrode tab 111b may be electrically connected to a positive electrode of the electrode assembly (not illustrated) within the unit cell 110. While the number of unit cells illustrated in FIG. 1C is five, the embodiments are not limited thereto.

The battery spacer 120 may include a base portion 121, a wing portion 122, and a fastening portion 123.

The base portion 121 may have, e.g., a plate shape. The base portion 121 may be interposed between unit cells 110 and may have at least a portion thereof contacting a large side surface of a unit cell 110.

The wing portion 122 may have, e.g., a plate shape. The wing portion 122 may enclose, i.e., cover, a small side surface of a unit cell 110, i.e., a surface that does not contact the base portion 121. That is, the wing portion 122 may extend from either side end of the base portion 121 in either direction about the base portion 121 toward neighboring, i.e., adjacent, battery spacers 120. Lengths L2a and L2b of the wing portions 122a and 122b projecting toward neighboring battery spacers from the base portion 121 may be less than a length L1 of a side surface of a unit cell 110.

The fastening portion 123 may include a fastening projection 123a and a fastening recess 123b. The fastening projection 123a may be formed at one end of the wing portion 122 projecting toward a neighboring battery spacer. The fastening recess 123b may be formed in the wing portion 122 opposite the fastening projection 123a. The fastening projection 123a and fastening recess 123b may have a vertical length less than a vertical length of the wing portion 122 and a horizontal width narrower than a horizontal width of the wing portion 122.

The battery spacer 120 may be formed from, e.g., one of a rubber, silicon, heat resistant plastic, and heat resistant metal material having, e.g., good heat conductivity. The unit cell 110 may generate heat during charge and discharge cycles. The battery spacer 120 may prevent direct contact between adjacent unit cells 110. The heat generated by the unit cells 110 may be conducted from surfaces contacting the unit cells 110 to surfaces of the wing portions 122, and may be ultimately externally radiated.

A description will be provided below of the structure of a secondary battery module and battery spacer of the secondary battery module according to another embodiment.

Figure 2A:
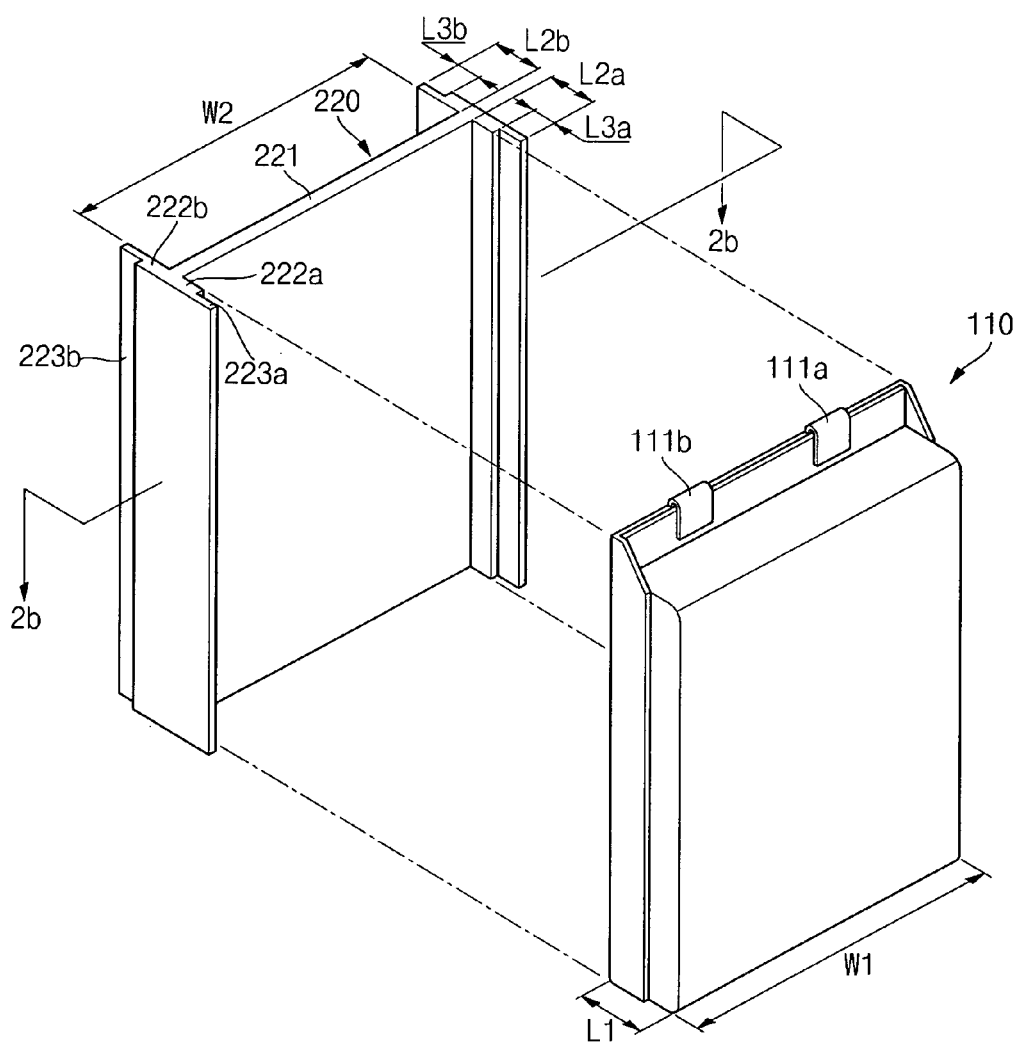
FIG. 2A illustrates a perspective view of coupling of a battery spacer and a unit battery cell according to another embodiment.
Figure 2B:
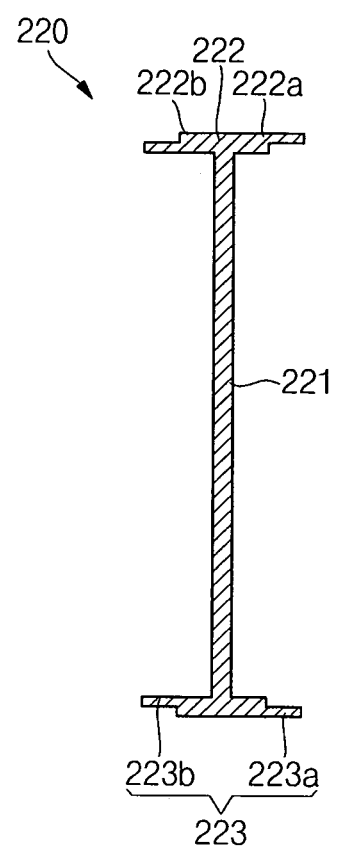
FIG. 2B illustrates a sectional view taken along line 2b-2b of FIG. 2A.
Figure 2C:
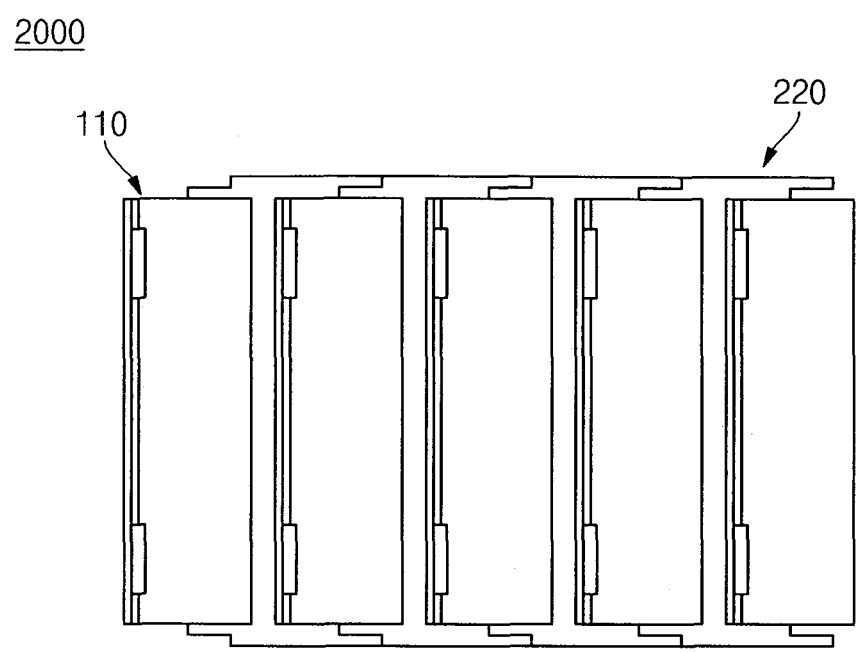
FIG. 2C illustrates a schematic plan view of a secondary battery module according to another embodiment.

FIG. 2A illustrates a perspective view of coupling of a battery spacer and unit cell according to another embodiment. FIG. 2B illustrates a sectional view taken along line 2b-2b of FIG. 2A. FIG. 2C illustrates a schematic plan view of a secondary battery module according to another embodiment.

Referring to FIGS. 2A, 2B, and 2C, a secondary battery module 2000 according to the present embodiment may be configured differently from the secondary battery module 1000 and battery spacer in FIGS. 1A, 1B, and 1C. Therefore, the secondary battery module 2000 according to the present embodiment will be described below with respect to the battery spacer. Also, like elements as those of the secondary battery module 1000 in FIGS. 1A, 1B, and 1C will be depicted with like reference numerals, and repeated detailed description thereof is omitted.

The battery spacer 220 may include a base portion 221, a wing portion 222, and a fastening portion 223.

The base portion 221 may have a plate shape. The base portion 221 may be interposed between unit cells 110 and may be formed such that at least one portion thereof contacts a large side surface of a unit cell 110.

The wing portion 222 may have a plate shape. The wing portion 222 may enclose a small side surface of a unit cell 110 that does not contact the base portion 221. That is, the wing portion 222 may extend in both directions from either side end of the base portion 221 and project from about the base portion 221 toward neighboring battery spacers.

The fastening portion 223 may include a first fastening portion 223a and a second fastening portion 223b. The first fastening portion 223a may be formed as a plate extending from one end of the wing portion 222 toward a neighboring battery spacer. Also, the first fastening portion 223a may have a width narrower than a width of the wing portion 222. Further, one side surface of the first fastening portion 223a may be coplanar to a side surface of the wing portion 222. The second fastening portion 223b may be formed on the other side of the wing portion 222 opposite the first fastening portion 223a. The second fastening portion 223b may have a width narrower than the width of the wing portion 222. Further, one side surface of the second fastening portion 223b may extend coplanar to the other side surface of the wing portion 222. A length L3b of the second fastening portion 223b projecting toward a neighboring battery spacer may be the same as a length L3a of the first fastening portion 223a projecting toward a neighboring spacer.

A sum of lengths L2a and L2b of the wing portions 222a and 222b projecting from the base portion 221 to neighboring battery spacers, minus the length L3a by which the first fastening portion 223a projects toward the neighboring battery spacer may equal a length L1 of the side surface of a unit cell 110.

The battery spacer 220 may be formed from, e.g., one of a rubber, silicon, heat resistant plastic, and heat resistant metal material having, e.g., good heat conductivity.

A description will be provided below of the structure of a secondary battery module and battery spacer of the secondary battery module according to yet another embodiment.

Figure 3A:
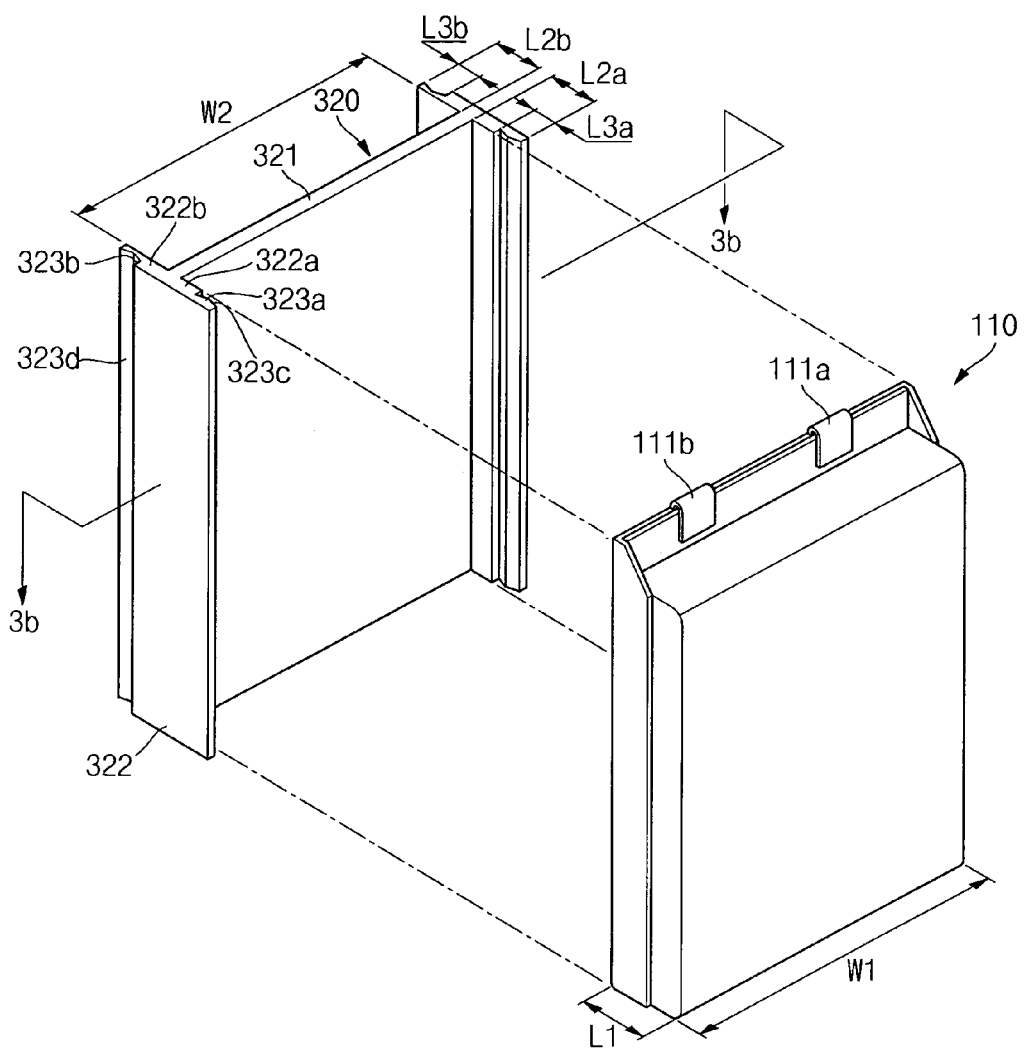
FIG. 3A illustrates a perspective view of coupling of a battery spacer and unit battery cell according to yet another embodiment.
Figure 3B:
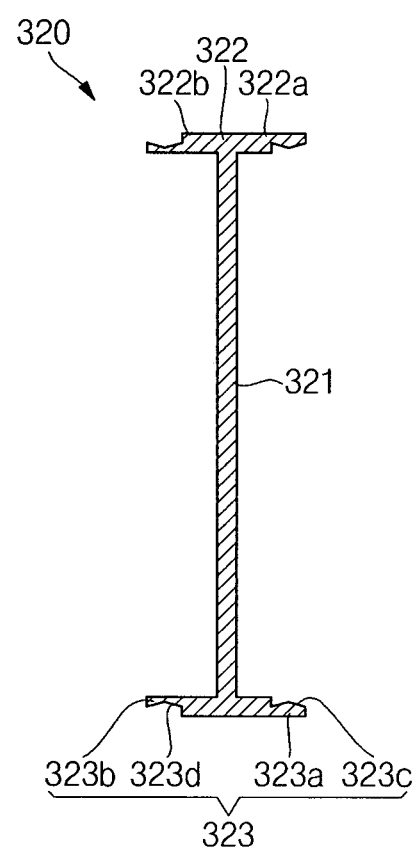
FIG. 3B illustrates a sectional view taken along line 3b-3b of FIG. 3A.
Figure 3C:
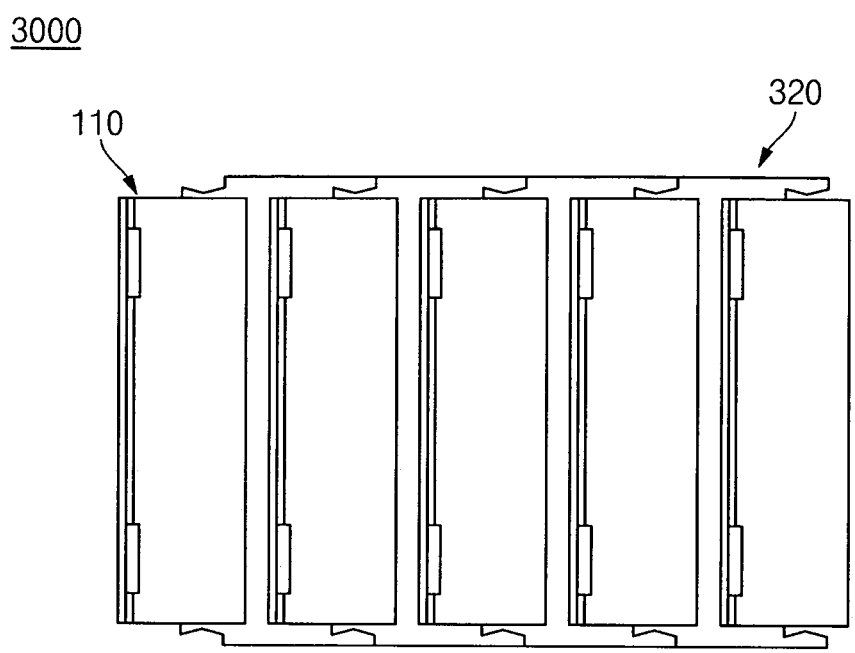
FIG. 3C illustrates a schematic plan view of a secondary battery module according to yet another embodiment.

FIG. 3A illustrates a perspective view of coupling of a battery spacer and unit battery cell according to yet another embodiment. FIG. 3B illustrates a sectional view taken along line 3b-3b of FIG. 3A. FIG. 3C illustrates a schematic plan diagram of a secondary battery module according to yet another embodiment.

Referring to FIGS. 3A, 3B, and 3C, a secondary battery module 3000 according to the present embodiment may be configured differently from the secondary battery module 2000 and battery spacer in FIGS. 2A, 2B, and 2C. Therefore, the secondary battery module 3000 according to the present embodiment will be described below with respect to the battery spacer. Also, like elements as those of the secondary battery module 2000 in FIGS. 2A, 2B, and 2C will be depicted with like reference numerals, and repeated detailed description thereof is omitted.

The battery spacer 320 may include a base portion 321, a wing portion 322, and a fastening portion 323.

The base portion 321 may have a plate shape. Also, the base portion 321 may be interposed between unit cells 110 and may be formed such that at least one portion thereof contacts a large side surface of a unit cell 110.

The wing portion 322 may have a plate shape. The wing portion 322 may enclose a small side surface of a unit cell 110, i.e., a surface that does not contact the base portion 321. That is, the wing portion 322 may extend in both directions from either side end of the base portion 321 and project from about the base portion 321 toward neighboring battery spacers.

The fastening portion 323 may include a first fastening portion 323a, a second fastening portion 323b, a fastening ridge 323c, and a fastening valley 323d. The first fastening portion 323a may have a plate shape extending from one end of the wing portion 322 toward a neighboring battery spacer. Also, the first fastening portion 323a may have a width narrower than a width of the wing portion 322. Further, one side surface of the first fastening portion 323a may extend coplanar to a side surface of the wing portion 322. A horizontal cross section of the first fastening portion 323a may have a triangular shape. The second fastening portion 323b may be formed on the other side of the wing portion 322, opposite to the first fastening portion 323a. Also, the second fastening portion 323b may have a width narrower than the width of the wing portion 322. Further, one side surface of the second fastening portion 323b may extend coplanar to the other side surface of the wing portion 322. The fastening ridge 323c may be formed on a surface of the first fastening portion 323a facing a unit cell 110 to firmly couple to a corresponding battery spacer 320. The fastening valley 323d may be defined in the second fastening portion 323b opposite the fastening ridge 323c of the first fastening portion 323a. A length L3b of the second fastening portion 323b projecting toward a neighboring battery spacer may be the same as a length L3a of the first fastening portion 323a projecting toward a neighboring spacer. The fastening ridge 323c of one battery spacer 320 may fit into the fastening valley 323d of an adjacent battery spacer 320 to couple the battery spacers 320 together. Due to the shape of the fastening portion 323 in the secondary battery module 3000 according to the present embodiment, coupling between battery spacers may be extremely stable.

In addition, a sum of lengths L2a and L2b of the wing portions 322a and 322b projecting from the base portion 321 to neighboring battery spacers, minus the length L3a by which the first fastening portion 323a projects toward the neighboring battery spacer may equal a length L1 of the side surface of a unit cell 110.

The battery spacer 320 may be formed from, e.g., one of a rubber, silicon, heat resistant plastic, and heat resistant metal material having, e.g., good heat conductivity.

A description will be provided below of the structure of a secondary battery module and battery spacer of the secondary battery module according to still another embodiment.

Figure 4A:
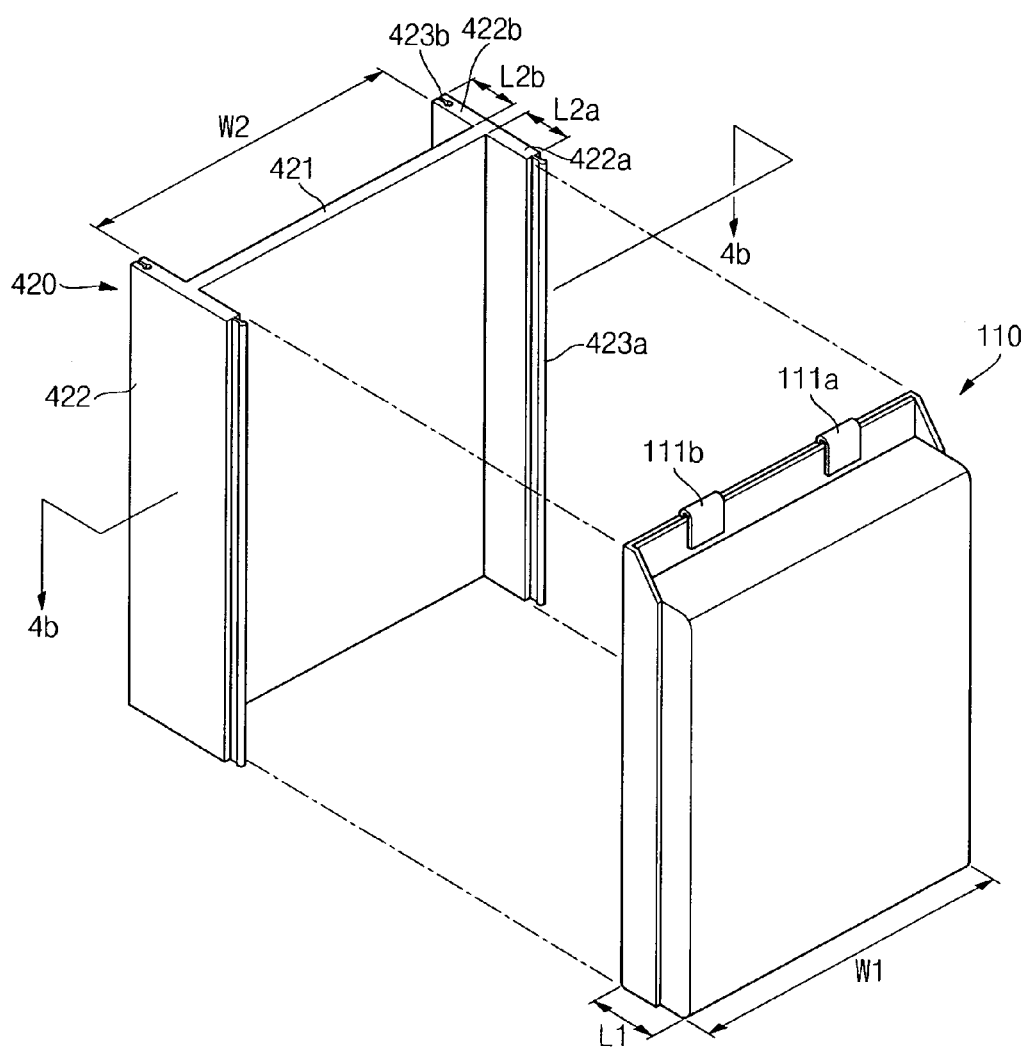
FIG. 4A illustrates a perspective view of coupling of a battery spacer and unit battery cell according to still another embodiment.
Figure 4B:
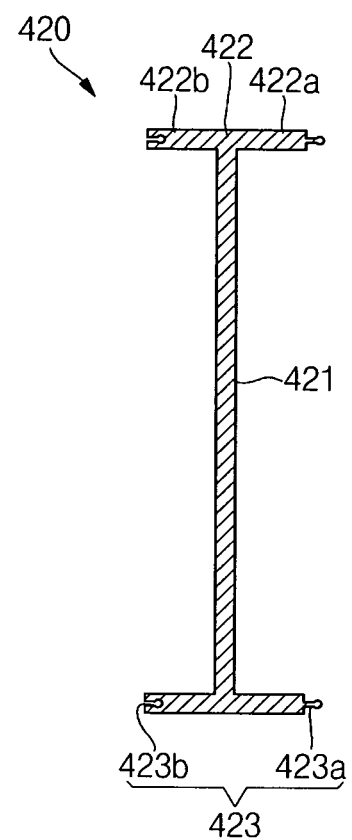
FIG. 4B illustrates a sectional view taken along line 4b-4b of FIG. 4A.
Figure 4C:
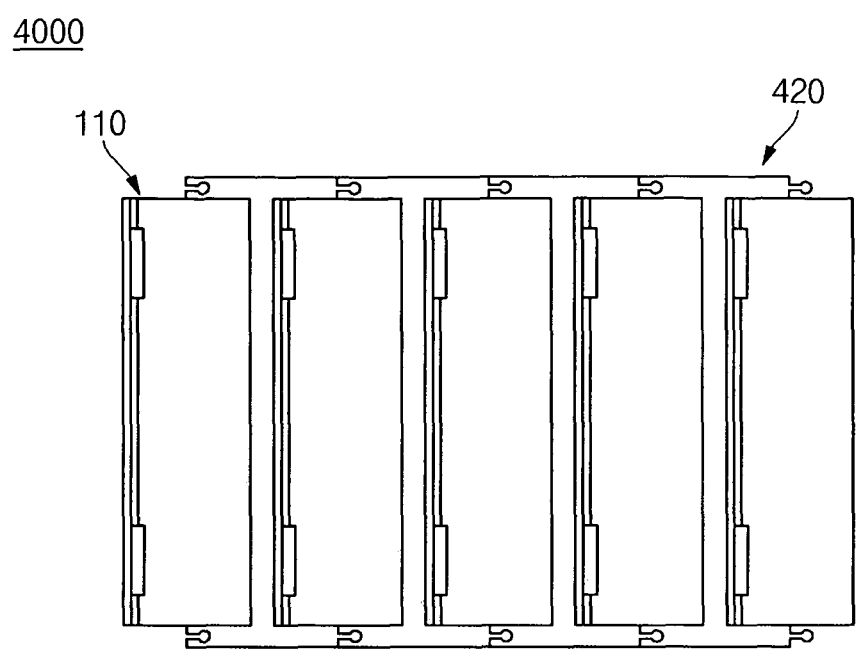
FIG. 4C illustrates a schematic plan view of a secondary battery module according to still another embodiment.

FIG. 4A illustrates a perspective view of coupling of a battery spacer and unit battery cell according to still another embodiment. FIG. 4B illustrates a sectional view taken along line 4b-4b of FIG. 4A. FIG. 4C illustrates a schematic plan view of a secondary battery module according to still another embodiment.

Referring to FIGS. 4A, 4B, and 4C, a secondary battery module 4000 according to the present embodiment is configured differently from the secondary battery module 1000 and battery spacer in FIGS. 1A, 1B, and 1C. Therefore, the secondary battery module 4000 according to the present embodiment will be described below with respect to the battery spacer. Also, like elements as those of the secondary battery module 1000 in FIGS. 1A, 1B, and 1C will be depicted with like reference numerals and repeated detailed description thereof will not be provided.

The battery spacer 420 may include a base portion 421, a wing portion 422, and a fastening portion 423.

The base portion 421 may have a plate shape. Also, the base portion 421 may be interposed between unit cells 110 and may be formed such that at least one portion thereof contacts a large side surface of a unit cell 110.

The wing portion 422 may have a plate shape. The wing portion 422 may enclose a small side surface of a unit cell 110, i.e., a surface that does not contact the base portion 421. That is, the wing portion 422 may extend in both directions from either side end of the base portion 421 and project from about the base portion 421 toward neighboring battery spacers. Lengths L2a and L2b of the wing portions 422a and 422b projecting from the base portion 421 toward neighboring battery spacers may be half the length L1 of the side surface of a unit battery 110.

The fastening portion 423 may include a sliding fastening projection 423a and a sliding fastening receptacle 423b. The sliding fastening projection 423a may be formed on an end of the wing portion 422 projecting toward a neighboring battery spacer. The sliding fastening projection 423a may have a round horizontal end cross section. A horizontal width of the sliding fastening projection 423a may be narrower than a horizontal width of the wing portion 422. A length of the sliding fastening projection 423a from a bottom to a top thereof may be the same as a length of the wing portion 422 from a bottom to a top thereof. The sliding fastening receptacle 423b may be formed on the other end of the wing portion 422, opposite to the sliding fastening projection 423a. Due to the shape of the fastening portion 423 of the secondary battery module 4000 according to the present embodiment, neighboring battery spacers 420 may be coupled by being slid vertically. In other words, the sliding fastening projection 423a may be slid into the sliding fastening receptacle 423b of an adjacent battery spacer 420 to couple the battery spacers 420 together.

The battery spacer 420 may be formed from, e.g., one of a rubber, silicon, heat resistant plastic, and heat resistant metal material having, e.g., good heat conductivity.

A description will be provided below of the structure of a secondary battery module and battery spacer of the secondary battery module according to still another embodiment.

Figure 5A:
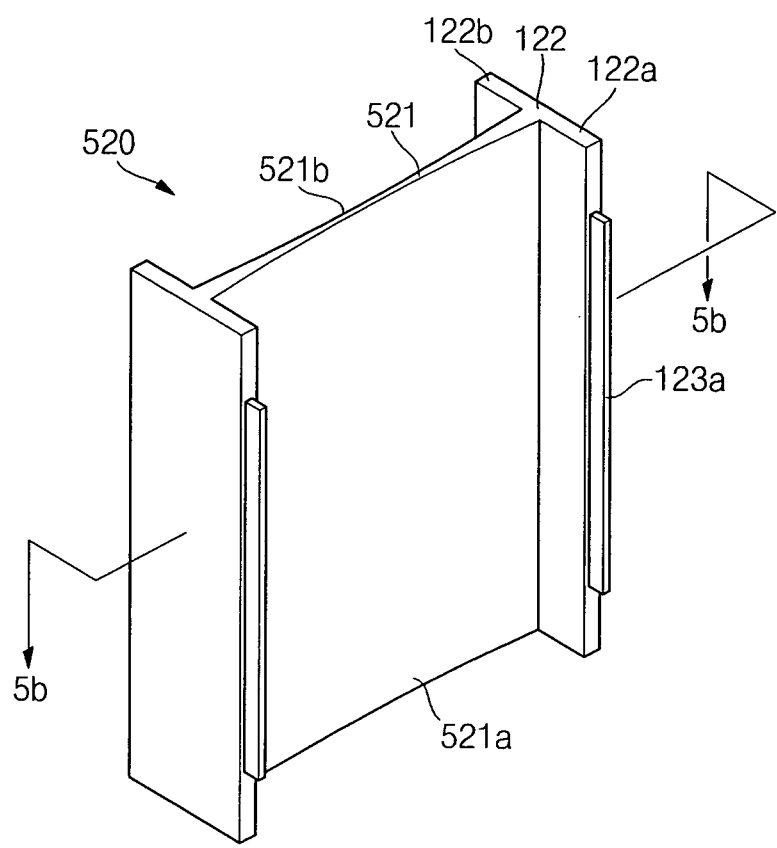
FIG. 5A illustrates a perspective view of a battery spacer according to still another embodiment.
Figure 5B:
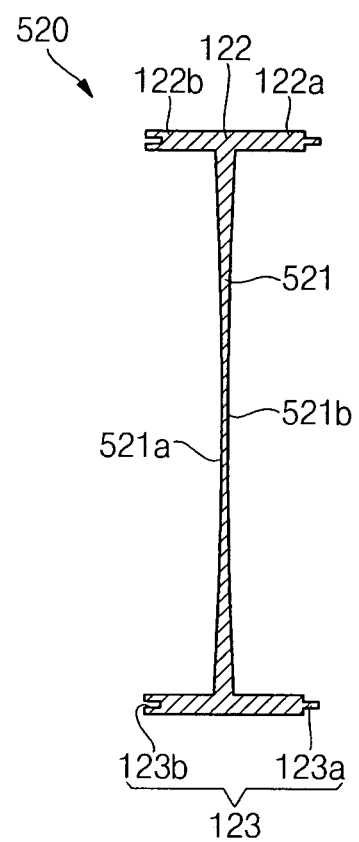
FIG. 5B illustrates a sectional view taken along line 5b-5b of FIG. 5A.

FIG. 5A illustrates a perspective view of a battery spacer according to still another embodiment. FIG. 5B illustrates a sectional view taken along line 5b-5b of FIG. 5A.

Referring to FIGS. 5A and 5B, a battery spacer 520 according to the present embodiment is configured differently from the battery spacer 120 and base portion in FIGS. 1A, and 1B. Therefore, the battery spacer 520 according to the present embodiment will be described below with respect to the base portion 521. Also, like elements as those of the battery spacer 120 in FIGS. 1A, and 1B will be depicted with like reference numerals, and repeated detailed description thereof will not be provided.

The battery spacer 520 may include a base portion 521, a wing portion 122, and a fastening portion 123.

The base portion 521 may have a plate shape. Also, the base portion 521 may be formed such that surfaces thereof face large side surfaces of unit cells. The surfaces of the base portion 521 may have concave curvatures in a direction deviating from, i.e., a direction opposite to, the unit cells.

A unit cell—in particular, a pouch-type cell—may swell due to volumetric expansion of gas generated therein during charging and discharging. Here, the base portion 521 configured as above may include spaces 521a and 521b that may accommodate swelling of the unit cells and prevent damage to the unit cells.

The structure of a battery spacer according to still another embodiment will be described below.

Figure 6A:
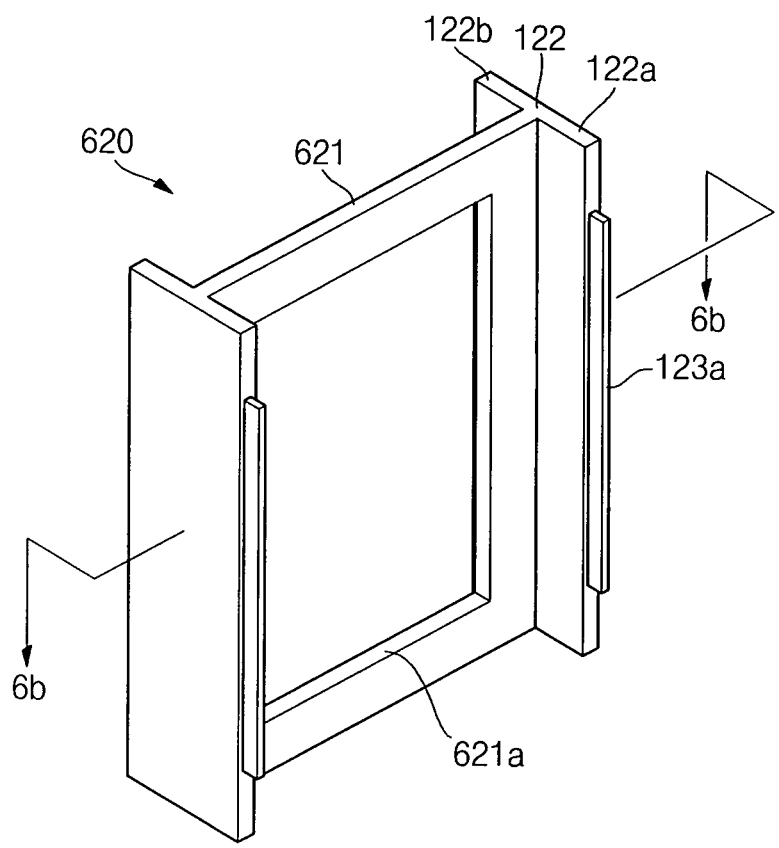
FIG. 6A illustrates a perspective view of a battery spacer according to still another embodiment.
Figure 6B:
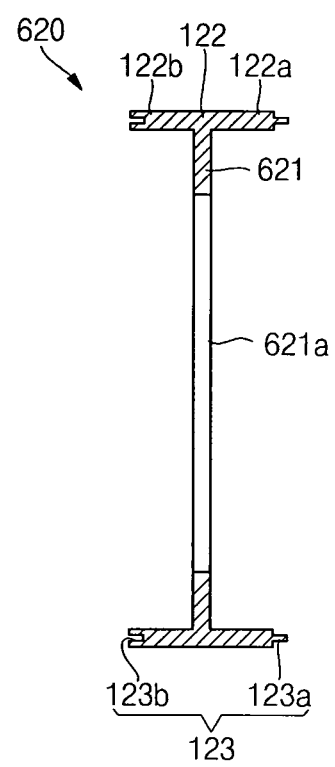
FIG. 6B illustrates a sectional view taken along line 6b-6b of FIG. 6A.

FIG. 6A illustrates a perspective view of a battery spacer according to still another embodiment. FIG. 6B illustrates a sectional view taken along line 6b-6b of FIG. 6A.

Referring to FIGS. 6A and 6B, a battery spacer 620 according to the present embodiment is configured differently from the battery spacer 120 and base portion in FIGS. 1A, and 1B. Therefore, the battery spacer 620 according to the present embodiment will be described below with respect to the base portion 621. Also, like elements as those of the battery spacer 120 in FIGS. 1A, and 1B will be depicted with like reference numerals, and repeated detailed description thereof will not be provided.

The battery spacer 620 may include a base portion 621, a wing portion 122, and a fastening portion 123.

The base portion 621 may have a plate shape. The base portion 621 may include a receiving hole 621a at a central portion thereof, the receiving hole 321a facing large side surfaces of unit cells.

A unit cell—in particular, a pouch-type cell—may swell due to volumetric expansion of gas generated therein during charging and discharging. Here, the base portion 621 configured as above may be provided with a space, the receiving hole 621a, that may accommodate swelling of the unit cells and prevent damage to the unit cells.

The structure of a battery spacer according to still another embodiment will be described below.

Figure 7A:
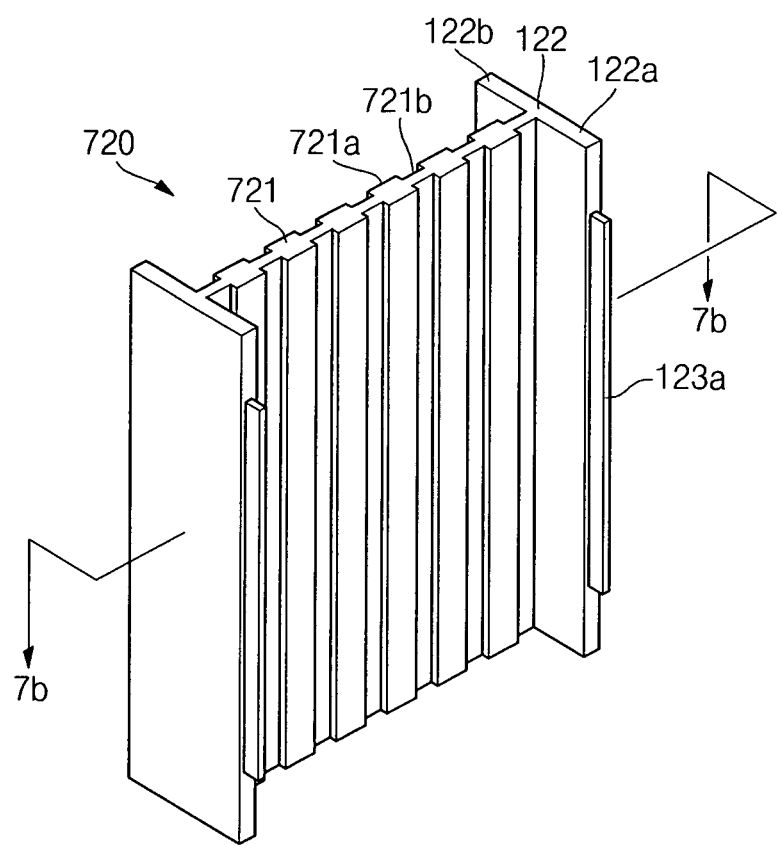
FIG. 7A illustrates a perspective view of a battery spacer according to still another embodiment.
Figure 7B:
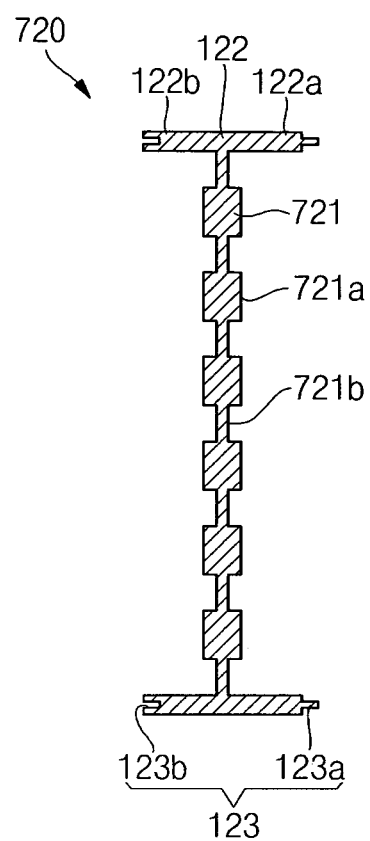
FIG. 7B illustrates a sectional view taken along line 7b-7b of FIG. 7A.

FIG. 7A illustrates a perspective view of a battery spacer according to still another embodiment. FIG. 7B illustrates a sectional view taken along line 7b-7b of FIG. 7A.

Referring to FIGS. 7A and 7B, a battery spacer 720 according to the present embodiment is configured differently from the battery spacer 120 and base portion in FIGS. 1A, and 1B. Therefore, the battery spacer 720 according to the present embodiment will be described below with respect to the base portion 721. Also, like elements as those of the battery spacer 120 in FIGS. 1A, and 1B will be depicted with like reference numerals, and repeated detailed description thereof will not be provided.

The battery spacer 720 may include a base portion 721, a wing portion 122, and a fastening portion 123.

The base portion 721 may include at least one or more corrugated recesses 721b defined in a surface 721a thereof facing a unit cell. The corrugated recesses 721b may extend from a bottom to a top of the base portion 721. Accordingly, the corrugated recesses 721b may increase an interfacial area between the unit cell 110 and battery spacer 720 and the atmosphere, thereby improving cooling effectiveness. Also, the base portion 721 configured as above may be provided with a space, the corrugated recesses 721b, that may accommodate swelling of the unit cells and prevent damage to the unit cells.

The structure of a battery spacer according to still another embodiment will be described below.

Figure 8A:
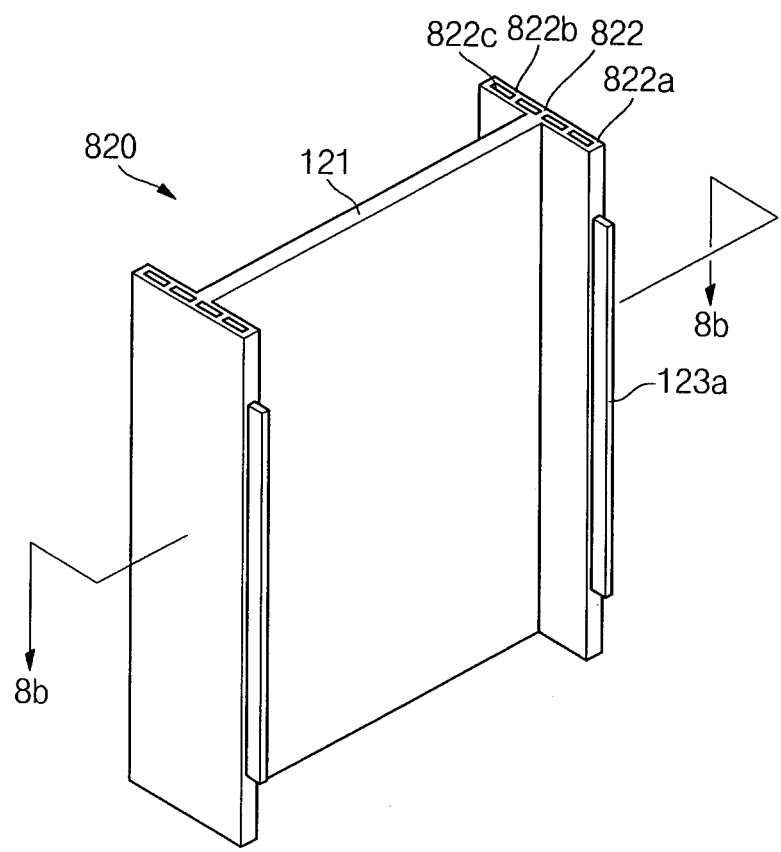
FIG. 8A illustrates a perspective view of a battery spacer according to still another embodiment.
Figure 8B:
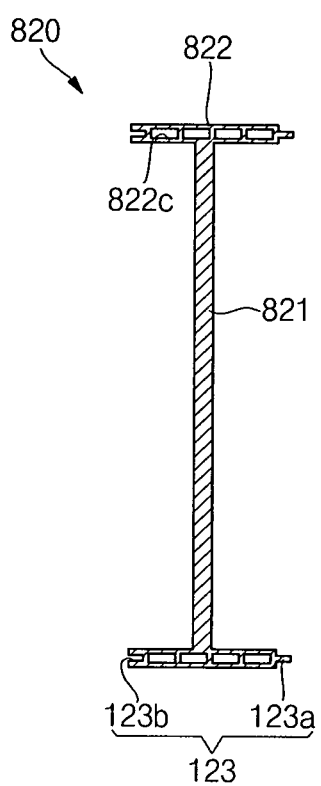
FIG. 8B illustrates a sectional view taken along line 8b-8b of FIG. 8A.

FIG. 8A illustrates a perspective view of a battery spacer according to still another embodiment. FIG. 8B illustrates a sectional view taken along line 8b-8b of FIG. 8A.

Referring to FIGS. 8A and 8B, a battery spacer 820 according to the present embodiment is configured differently from the battery spacer 120 and wing portion in FIGS. 1A, and 1B. Therefore, the battery spacer 820 according to the present embodiment will be described below with respect to the wing portion 822. Also, like elements as those of the battery spacer 120 in FIGS. 1A, and 1B will be depicted with like reference numerals, and repeated detailed description thereof will not be provided.

The battery spacer 820 may include a base portion 121, a wing portion 822, and a fastening portion 123.

The wing portion 822 may have a plate shape. The wing portion 822 may enclose a small side surface of a unit cell 110, i.e., a surface that does not contact the base portion 121. That is, the wing portion 822 may project from either side end of the base portion 121 toward neighboring battery spacers about the base portion 121. Also, the wing portion 822 may include at least one or more heat sink holes 822c. The heat sink holes 822c may be defined as holes through the wing portion 822. In other words, the heat sink holes 822c may penetrate through the wing portions 822 in a vertical direction. The heat sink holes 822c may improve cooling efficiency of the battery spacer 820 by increasing the interfacial area between the battery spacer 820 and the external atmosphere.

In an implementation, any of the fastening portions illustrated in FIGS. 1-4 may be included in the battery spacers illustrated in FIGS. 5-8.

By way of review and recap, during the charging or discharging of a secondary battery module's unit cells, a quantity of gas may be generated together with heat. The gas generated within a unit cell may cause swelling to occur, whereby the unit cell expands in volume.

Heat generated in unit cells may reduce electrochemical performance of the cells and may also reduce the life of the battery cells. A unit cell that generates heat should therefore be cooled as quickly as possible.

Also, in the manufacturing process of a secondary battery module, unit cells should be arranged uniformly for efficient space utilization.

As described above, in a manufacturing process of a secondary battery module according to an embodiment, time and effort required to align a plurality of unit cells may be reduced by use of a battery spacer. Also, the fastening portion of a battery spacer may firmly couple a unit cell to the battery spacer.

Also, because alignment between the unit cells and battery spacer in the secondary battery module may be superb and the battery spacer may be formed of a material with good thermal conductivity, each unit cell may be uniformly and efficiently cooled. Accordingly, service life of a secondary battery module according to an embodiment may be extended.

Further, because a secondary battery module according to an embodiment may have a battery spacer capable of accommodating swelling of unit cells, damage caused by volumetric expansion of unit cells may be prevented.

The secondary battery module of an embodiment may have a structure that can accommodate swelling that occurs amongst unit cells that are adjacent to one another in the secondary battery module. In addition, the corresponding structures of the battery spacers of the embodiments may allow for ease of modularization.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery module, comprising:
a plurality of unit cells; and
a battery spacer between the unit cells, the battery spacer including:
a base portion, the base portion including a portion contacting a large side surface of one unit cell and another portion contacting a large side surface of another unit cell adjacent to the one unit cell such that the base portion is between the one unit cell and the adjacent unit cell,
a wing portion projecting from the base portion toward an adjacent battery spacer and enclosing at least a portion of a small side surface of the one unit cell and projecting from the base portion toward another adjacent battery spacer and enclosing at least a portion of a small side surface of the other unit cell adjacent to the one unit cell such that the wing portion projects about the same distance away from the base portion in each of opposing directions, and a fastening portion on the wing portion, the fastening portion
couplingly engaging and directly contacting a complementary fastening portion of the adjacent battery spacer to couple the battery spacer and the adjacent battery spacer together,
having a horizontal width narrower than a horizontal width of the wing portion,
including a fastening projection extending from an end of the wing portion toward the adjacent battery spacer, and
including a fastening recess corresponding to the fastening projection, the fastening recess being disposed on an opposite end of the wing portion.

2. The secondary battery module as claimed in claim 1, wherein the fastening projection has:
a rectangular bar-shape, and
a vertical length less than a vertical length of the wing portion.

3. The secondary battery module as claimed in claim 1, wherein the fastening portion comprises:
a first fastening portion extending from an end of the wing portion toward the adjacent battery spacer; and a second fastening portion on an opposite end of the wing portion and projecting toward another adjacent battery spacer,
wherein a side surface of the first fastening portion extending toward the adjacent battery spacer is coplanar to a side surface of the wing portion, and a side surface of the second fastening portion extending toward the other adjacent battery spacer is coplanar to an opposite side surface of the wing portion.

4. The secondary battery module as claimed in claim 3, wherein the fastening portion further comprises:
a fastening ridge on a surface of the first fastening portion facing a unit cell; and
a fastening valley on the second fastening portion and corresponding to the fastening ridge.

5. The secondary battery module as claimed in claim 4, wherein the fastening ridge has a triangular horizontal section.

6. The secondary battery module as claimed in claim 1, wherein the fastening portion comprises:
a sliding fastening projection extending from an end of the wing portion toward the adjacent battery spacer, the sliding fastening projection having a round horizontal end cross section; and
a sliding fastening receptacle on an opposite end of the wing portion and corresponding to the sliding fastening projection.

7. The secondary battery module as claimed in claim 6, wherein the sliding fastening projection has a length from a bottom to a top of the sliding fastening projection is equal to a length from a bottom to a top of the wing portion.

8. The secondary battery module as claimed in claim 1, wherein the base portion is configured to be capable of accommodating swelling of the unit cell.

9. The secondary battery module as claimed in claim 8, wherein a surface of the base portion that faces a large side surface of the unit cell is concave in a direction opposite to the unit cell.

10. The secondary battery module as claimed in claim 8, wherein a surface of the base portion facing a large side surface of the unit cell includes a receiving hole through a center thereof.

11. The secondary battery module as claimed in claim 8, wherein the base portion comprises at least one corrugated recess extending from a bottom to a top of the base portion.

12. The secondary battery module as claimed in claim 1, wherein the wing portion comprises at least one heat sink hole.

13. The secondary battery module as claimed in claim 1, wherein the battery spacer is formed from at least one of a rubber material, a silicon material, a heat resistant plastic, and a heat resistant metal.

14. The secondary battery module as claimed in claim 1, wherein the unit cell is a pouch-type unit cell.

15. A battery spacer, comprising:
a base portion, the base portion including a portion for contacting a large side surface of one unit cell and another portion for contacting a large side surface of another unit cell adjacent to the one unit cell such that the base portion is between the one unit cell and the adjacent unit cell;
a wing portion projecting from the base portion and being configured to project toward an adjacent battery spacer, the wing portion being for enclosing at least a portion of a small side surface of the one unit cell and projecting from the base portion toward another adjacent battery spacer and being for enclosing at least a portion of a small side surface of the other unit cell adjacent to the one unit cell such that the wing portion projects about the same distance away from the base portion in each of opposing directions; and, a fastening portion on the wing portion, the fastening portion
couplingly engaging and directly contacting a complementary fastening portion of the adjacent battery spacer to couple the battery spacer and the adjacent battery spacer together,
having a horizontal width narrower than a horizontal width of the wing portion,
including a fastening projection extending from an end of the wing portion toward the adjacent battery spacer, and
including a fastening recess corresponding to the fastening projection, the fastening recess being disposed on an opposite end of the wing portion.

16. The battery spacer as claimed in claim 15, wherein the fastening portion includes:
a first fastening portion extending from an end of the wing portion and being configured to extend toward the adjacent battery spacer;
a second fastening portion on an opposite end of the wing portion and being configured to project toward another adjacent battery spacer;
a fastening ridge on a surface of the first fastening portion and being configured to face the unit cell; and
a fastening valley on the second fastening portion and corresponding to the fastening ridge,
wherein a side surface of the first fastening portion for extending toward the adjacent battery spacer is coplanar to a side surface of the wing portion, and a side surface of the second fastening portion for extending toward the other adjacent battery spacer is coplanar to an opposite side surface of the wing portion.

17. The battery spacer as claimed in claim 15, wherein the fastening portion includes:
a sliding fastening projection extending from an end of the wing portion and being configured to extend toward the adjacent battery spacer, the sliding fastening projection having a round horizontal end cross section; and
a sliding fastening receptacle on an opposite end of the wing portion and corresponding to the sliding fastening projection.

18. The battery spacer as claimed in claim 15, wherein a surface of the base portion for facing a large side surface of the unit cell is configured to be concave in a direction opposite to the unit cell.

19. The battery spacer as claimed in claim 15, wherein a surface of the base portion facing a large side surface of the unit cell includes a receiving hole through a center thereof.

20. The battery spacer as claimed in claim 15, wherein the base portion includes at least one corrugated recess extending from a bottom to a top of the base portion.

21. The battery spacer as claimed in claim 15, wherein the wing portion includes at least one heat sink hole.

22. The battery spacer as claimed in claim 15, wherein the battery spacer is formed from at least one of a rubber material, a silicon material, a heat resistant plastic, and a heat resistant metal.

* * * * *